US010680416B2

United States Patent
Tenkumo et al.

(10) Patent No.: US 10,680,416 B2
(45) Date of Patent: Jun. 9, 2020

(54) METHOD FOR PRODUCING A SPARK PLUG INCLUDING AN ELECTRODE HAVING A BASE PORTION AND A TIP FIXED TO THE BASE PORTION

(71) Applicant: NGK SPARK PLUG CO., LTD., Nagoya-shi, Aichi (JP)

(72) Inventors: Yusuke Tenkumo, Nagoya (JP); Susumu Imai, Nagoya (JP)

(73) Assignee: NGK SPARK PLUG CO., LTD., Nagoya-shi, Aichi (JP)

( * ) Notice: Subject to any disclaimer, the term of this patent is extended or adjusted under 35 U.S.C. 154(b) by 0 days.

(21) Appl. No.: 16/481,164

(22) PCT Filed: Dec. 11, 2017

(86) PCT No.: PCT/JP2017/044453
§ 371 (c)(1),
(2) Date: Jul. 26, 2019

(87) PCT Pub. No.: WO2018/139079
PCT Pub. Date: Aug. 2, 2018

(65) Prior Publication Data
US 2019/0393683 A1 Dec. 26, 2019

(30) Foreign Application Priority Data
Jan. 27, 2017 (JP) .................................. 2017-012807

(51) Int. Cl.
| | |
|---|---|
| *H01T 13/20* | (2006.01) |
| *H01T 21/02* | (2006.01) |
| *B23K 26/0622* | (2014.01) |
| *B23K 26/08* | (2014.01) |
| *B23K 26/28* | (2014.01) |

(Continued)

(52) U.S. Cl.
CPC .......... *H01T 13/20* (2013.01); *B23K 26/0622* (2015.10); *B23K 26/0876* (2013.01); *B23K 26/28* (2013.01); *H01T 21/02* (2013.01); *B23K 2101/36* (2018.08); *H01T 13/39* (2013.01)

(58) Field of Classification Search
CPC ..... H01T 13/20; H01T 21/02; B23K 26/0876; B23K 26/28; B23K 26/0622
See application file for complete search history.

(56) References Cited

U.S. PATENT DOCUMENTS

2013/0221832 A1    8/2013   Ishiguro et al.

FOREIGN PATENT DOCUMENTS

| JP | H01-233085 A | 9/1989 |
|---|---|---|
| JP | 2012-074271 A | 4/2012 |

(Continued)

OTHER PUBLICATIONS

International Search Report from corresponding International Patent Application No. PCT/JP2017/044453, dated Jan. 9, 2018.

*Primary Examiner* — Joseph L Williams
(74) *Attorney, Agent, or Firm* — Kusner & Jaffe (57) ABSTRACT

A tip is welded appropriately using an energy beam. The tip is welded to a base portion by irradiating the interface between the base portion and the tip with the energy beam. The welding the tip to the base portion includes: applying the energy beam continuously, while moving the irradiation position of the energy beam, in a first period of time; and applying the energy beam a plurality of times according to a pulsed output pattern, while moving the irradiation position of the energy beam, in a second period of time subsequent to the first period of time.

7 Claims, 5 Drawing Sheets

(51) Int. Cl.
  *B23K 101/36*      (2006.01)
  *H01T 13/39*       (2006.01)

(56)          References Cited

FOREIGN PATENT DOCUMENTS

METHOD FOR PRODUCING A SPARK PLUG INCLUDING AN ELECTRODE HAVING A BASE PORTION AND A TIP FIXED TO THE BASE PORTION

FIELD OF THE INVENTION

The present description relates to a spark plug including an electrode having a base portion and a tip fixed to the base portion.

BACKGROUND OF THE INVENTION

In some cases, to improve the durability of an electrode (e.g., a center electrode or a ground electrode) of a spark plug, a highly durable tip (for example, a tip containing a noble metal) is fixed to the electrode. One technique proposed to fix a ground electrode tip is to weld the tip to a ground electrode by irradiating the interface between the ground electrode and the ground electrode tip with, for example, a laser beam while moving the laser beam. In another proposed technique, the power of the laser beam is gradually reduced in consideration of the fact that heat imparted by the laser beam transfers through a molten portion to cause the temperature of a portion unirradiated with the laser beam to increase. For a prior art example, see Japanese Patent Application Laid-Open (kokai) No. 2012-74271 ("Patent Document 1").

When the power of the laser beam is reduced, proper welding may not be possible. For example, in some cases, the laser beam becomes unstable, and the irradiation with the laser beam stops unintentionally. This is a common problem not only when the laser beam is used but also when energy beams such as electron beams are used.

The present description discloses a technique for welding a tip appropriately using an energy beam.

SUMMARY OF THE INVENTION

The present description discloses, for example, the following mode and application examples.

Mode

A spark plug comprising an electrode having a base portion and a tip fixed to the base portion,
further comprising a joint portion which joins the tip and the base portion together,
wherein a continuous mark and a plurality of spot-shaped marks are formed in a row on a surface of the joint portion.

Application Example 1

A method for producing a spark plug including an electrode having a base portion and a tip fixed to the base portion, the method comprising
welding the tip to the base portion by irradiating an interface between the base portion and the tip with an energy beam,
wherein the welding the tip to the base portion includes
applying the energy beam continuously, while moving an irradiation position of the energy beam, in a first period of time and
applying the energy beam a plurality of times according to a pulsed output pattern, while moving the irradiation position of the energy beam, in a second period of time subsequent to the first period of time.

In this configuration, the base portion and the tip are prevented from undergoing a steep change in temperature in the first period of time in contrast to the case where the energy beam is applied a plurality of times according to a pulsed output pattern, and therefore the occurrence of cracking in the joint portion between the base portion and the tip can be prevented. In the second period of time, the energy beam is applied a plurality of times according to the pulsed output pattern. Therefore, the average of the output energy per unit time of the pulsed energy beam can be reduced without excessively reducing its output energy per unit time. Therefore, excessive melting of the base portion and the tip can be prevented. In the second period of time, it is unnecessary to excessively reduce the output energy per unit time of the energy beam, so that instability of the energy beam can be prevented. Therefore, the tip can be appropriately welded to the base portion using the energy beam.

Application Example 2

A method for producing a spark plug described in Application Example 1, wherein, in a specific period of time which is at least part of the first period of time, the output energy per unit time of the energy beam is gradually reduced.

In this configuration, since the output energy per unit time of the energy beam decreases gradually in the specific period of time, excessive melting of the base portion and the tip can be further prevented.

Application Example 3

A method for producing a spark plug described in Application Example 2, wherein the specific period of time is a period of time continuous with the second period of time.

In this configuration, the output energy per unit time of the energy beam decreases gradually in the specific period which is a relatively late part of the first period of time. Therefore, excessive melting of the base portion and the tip can be prevented.

Application Example 4

A method for producing a spark plug described in any of Application Examples 1 to 3, wherein the second period of time includes a first partial period of time and a second partial period of time subsequent to the first partial period of time, and
wherein the average of the output energy per unit time of the energy beam in the second partial period of time is smaller than the average of the output energy per unit time of the energy beam in the first partial period of time.

In this configuration, in the second partial period of time which is the second half of the second period of time, the average of the output energy per unit time is smaller than that in the first partial period of time which is the first half of the second period of time, and therefore excessive melting of the base portion and the tip can be prevented.

Application Example 5

A method for producing a spark plug described in any of Application Examples 1 to 4, wherein the output energy per unit time of the energy beam in the second period of time is equal to the output energy per unit time of the energy beam at the end of the first period of time.

In this configuration, spattering of molten parts of the base portion and the tip can be prevented more reliably as compared with the case where the output energy per unit time of the energy beam applied according to the pulsed output pattern is larger than the output energy per unit time of the energy beam at the end of the first period of time. Moreover, it is possible to more reliably prevent the energy beam from becoming instable as compared with the case where the output energy per unit time of the energy beam applied according to the pulsed output pattern is smaller than the output energy per unit time of the energy beam at the end of the first period of time. Therefore, the tip can be appropriately welded to the base portion.

Application Example 6

A method for producing a spark plug described in any of Application Examples 1 to 5, wherein the second period of time includes a first sub-period of time and a second sub-period of time subsequent to the first sub-period of time, and wherein the pulse width of the energy beam in the second sub-period of time is narrower than the pulse width of the energy beam in the first sub-period of time.

In this configuration, the repetition period at which the pulsed energy beam is applied in the second sub-period of time can be shortened without increasing the average of the output energy per unit time. Therefore, an increase in time between energy beam pulses during which the energy beam is not applied can be prevented. This can prevent an increase in distance between adjacent irradiation positions of the pulsed energy beam in the second sub-period of time. Therefore, insufficient melting of the tip and the base portion in regions between adjacent irradiation positions can be prevented.

The technique disclosed in the present description can be embodied in various forms. For example, the technique can be embodied in forms such as a method for producing a spark plug, the spark plug produced by the production method, an ignition device including the spark plug, and an internal combustion engine including the spark plug.

DETAILED DESCRIPTION OF THE INVENTION

A. First Embodiment

Figure 1:
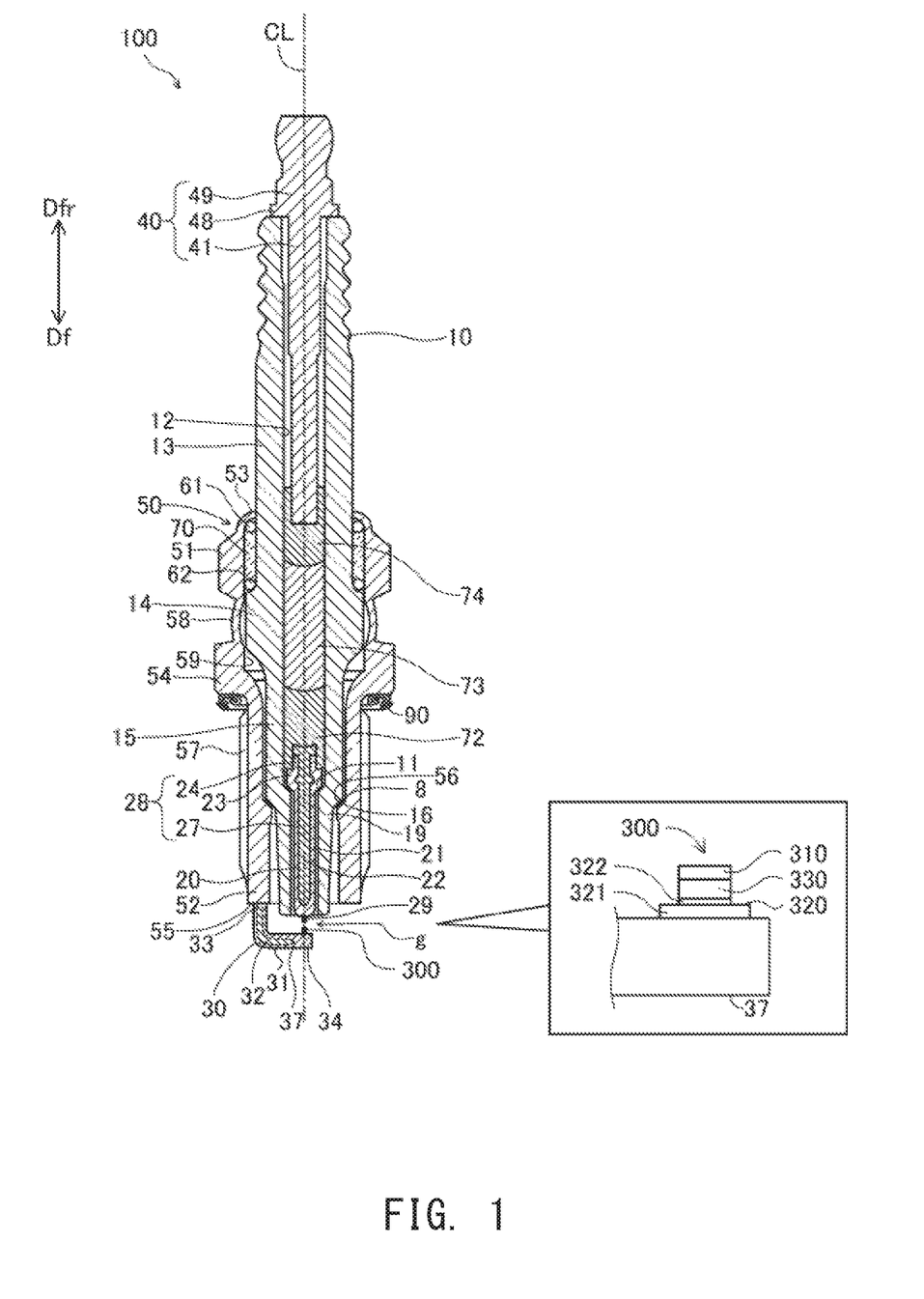
FIG. 1 is a cross-sectional view of a spark plug 100 of one embodiment which includes an electrode with a tip.

A-1. Structure of Spark Plug 100:

FIG. 1 is a cross-sectional view of a spark plug 100 of an embodiment which includes an electrode with a tip. This figure shows a center axis CL (which may be referred to also as an "axial line CL") of the spark plug 100 and a flat cross section of the spark plug 100 that contains the center axis CL. Hereinafter, a direction parallel to the center axis CL is referred to as the "direction of the axial line CL" or simply as the "axial direction" or the "front-back direction." A direction perpendicular to the axial line CL is referred to also as a "radial direction." A circumferential direction of a circle centered at the axial line CL is referred to simply as a "circumferential direction." A direction parallel to the center axis CL and toward the lower side in FIG. 1 is referred to a forward end direction Df or a forward direction Df, and a direction toward the upper side is referred to as a rearward end direction Dfr or a rearward direction Dfr. The forward end direction Df is a direction from a metallic terminal 40 described later toward a center electrode 20 described later. The forward end direction Df side in FIG. 1 is referred to as the forward end side of the spark plug 100, and the rearward end direction Dfr side in FIG. 1 is referred to as the rear end side of the spark plug 100.

The spark plug 100 includes: a tubular insulator 10 having a through hole 12 (referred to also as an axial hole 12) extending along the axial line CL; a center electrode 20 held at the forward end of the through hole 12; a metallic terminal 40 held at the rear end of the through hole 12; a resistor 73 disposed between the center electrode 20 and the metallic terminal 40 within the through hole 12; an electrically conductive first seal member 72 in contact with the center electrode 20 and the resistor 73 to electrically connect the center electrode 20 and the resistor 73; an electrically conductive second seal member 74 in contact with the resistor 73 and the metallic terminal 40 to electrically connect the resistor 73 and the metallic terminal 40; a tubular metallic shell 50 fixed to the outer circumferential side of the insulator 10; and a ground electrode 30 having a first end joined to a forward end surface 55 of the metallic shell 50 and a second end disposed so as to face the center electrode 20 through a gap g.

The insulator 10 has a large-diameter portion 14 having the largest outside diameter and formed approximately at the center with respect to the axial direction. A rear trunk portion 13 is formed rearward of the large-diameter portion 14. A forward trunk portion 15 having a smaller outer diameter than the rear trunk portion 13 is formed forward of the large-diameter portion 14. An outer-diameter decreasing portion 16 and a leg portion 19 are formed forward of the forward trunk portion 15 and arranged in this order toward the forward end side. The outer diameter of the outer-diameter decreasing portion 16 decreases gradually in the forward direction Df. An inner-diameter decreasing portion 11 having an inner diameter decreasing gradually in the forward direction Df is formed in the vicinity of the outer-diameter decreasing portion 16 (in the forward trunk portion 15 in the example in FIG. 1). It is preferable to form the insulator 10 in consideration of mechanical strength, thermal strength, and electrical strength, and the insulator 10 is formed, for example, by firing alumina (other insulating materials may be used).

The center electrode 20 is a metallic member and is disposed within the through hole 12 of the insulator 10 to be located at its end portion on the forward direction Df side. The center electrode 20 has an approximately cylindrical rod portion 28 and a first tip 29 joined (e.g., laser-welded) to the forward end of the rod portion 28. The rod portion 28 has a head portion 24 that is a portion on the rearward direction Dfr side and a shaft portion 27 connected to the forward direction Df side of the head portion 24. The shaft portion 27 extends parallel to the axial line CL in the forward direction Df. A portion of the head portion 24 that is located on the forward direction Df side forms a flange portion 23 having a larger outer diameter than the shaft portion 27. A surface of the flange portion 23 that is located on the forward direction Df side is supported by the inner-diameter decreasing portion 11 of the insulator 10. The shaft portion 27 is connected to the forward direction Df side of the flange portion 23. The first tip 29 is connected to the forward end of the shaft portion 27. The first tip 29 may be omitted.

The rod portion 28 has an outer layer 21 and a core 22 disposed on the inner circumferential side of the outer layer 21. The outer layer 21 is formed of a material (e.g., an alloy containing nickel as a main component) having higher oxidation resistance than the core 22. The main component means a component with the highest content (% by weight (wt %)). The core 22 is formed of a material (such as pure copper or an alloy containing copper as a main component) having a higher thermal conductivity than the outer layer 21. The first tip 29 is formed using a material (e.g., a noble metal such as iridium (Ir) or platinum (Pt)) having higher durability against discharge than the shaft portion 27. A forward end portion of the center electrode 20 that includes the first tip 29 protrudes from the axial hole 12 of the insulator 10 toward the forward direction Df side. The core 22 may be omitted.

The metallic terminal 40 is a rod-shaped member extending parallel to the axial line CL. The metallic terminal 40 is formed of an electrically conductive material (e.g., a metal containing iron as a main component). The metallic terminal 40 has a cap attachment portion 49, a flange portion 48, and a shaft portion 41 that are arranged in this order in the forward direction Df. The shaft portion 41 is inserted into a portion of the axial hole 12 of the insulator 10, which portion is located on the rearward direction Dfr side. The cap attachment portion 49 protrudes outward from the axial hole 12 on the rear end side of the insulator 10.

The resistor 73 for reducing electrical noise is disposed between the metallic terminal 40 and the center electrode 20 within the axial hole 12 of the insulator 10. The resistor 73 is formed using an electrically conductive material (e.g., a mixture of glass, carbon particles, and ceramic particles). The first seal member 72 is disposed between the resistor 73 and the center electrode 20, and the second seal member 74 is disposed between the resistor 73 and the metallic terminal 40. The seal members 72 and 74 are formed using an electrically conductive material (e.g., a mixture of metal particles and the same glass as that contained in the material of the resistor 73). The center electrode 20 is electrically connected to the metallic terminal 40 through the first seal member 72, the resistor 73, and the second seal member 74.

The metallic shell 50 is a tubular member having a through hole 59 extending along the axial line CL. The insulator 10 is inserted into the through hole 59 of the metallic shell 50, and the metallic shell 50 is fixed to the outer circumferential surface of the insulator 10. The metallic shell 50 is formed using an electrically conductive material (e.g., a metal such as carbon steel containing iron as a main component). Part of the insulator 10 that is located on the forward direction Df side protrudes outward from the through hole 59. Part of the insulator 10 that is located on the rearward direction Dfr side protrudes outward from the through hole 59.

The metallic shell 50 has a tool engagement portion 51 and a trunk portion 52. A spark plug wrench (not shown) is to be fitted to the tool engagement portion 51. The trunk portion 52 is a portion including the forward end surface 55 of the metallic shell 50. A threaded portion 57 that is to be screwed into an attachment hole of an internal combustion engine (e.g., a gasoline engine) is formed on the outer circumferential surface of the trunk portion 52. The threaded portion 57 is a portion having formed thereon a male thread extending in the direction of the axial line CL and has a helical thread (not shown) and a helical thread groove (not shown).

A flange portion 54 having a flange shape protruding radially outward is formed on the outer circumferential surface of the metallic shell 50 at a position between the tool engagement portion 51 and the trunk portion 52. An annular gasket 90 is disposed between the threaded portion 57 of the trunk portion 52 and the flange portion 54. The gasket 90 is formed, for example, by bending a metallic plate-shaped member and is to be crushed and deformed when the spark plug 100 is attached to the engine. The deformed gasket 90 seals the gap between the spark plug 100 (specifically, a surface of the flange portion 54 on the forward direction Df side) and the engine, and leakage of combustion gas is thereby prevented. The gasket 90 may be omitted. In this case, the flange portion 54 may come into direct contact with a portion (e.g., an engine head) of the engine in which the attachment hole for the spark plug 100 is formed.

An inner-diameter decreasing portion 56 whose inner diameter decreases gradually toward the forward end side is formed in the trunk portion 52 of the metallic shell 50. A forward end-side packing 8 is sandwiched between the inner-diameter decreasing portion 56 of the metallic shell 50 and the outer-diameter decreasing portion 16 of the insulator 10. In the present embodiment, the forward end-side packing 8 is, for example, an iron-made plate-shaped ring (another material (e.g., a metal material such as copper) can also be used).

A thin-walled crimp portion 53 is formed rearward of the tool engagement portion 51 of the metallic shell 50. A thin-walled buckle portion 58 is formed between the flange portion 54 and the tool engagement portion 51. Annular ring members 61 and 62 are inserted between the outer circumferential surface of the rear trunk portion 13 of the insulator 10 and the inner circumferential surfaces of the tool engagement portion 51 and the crimp portion 53 of the metallic shell 50. The space between the ring members 61 and 62 is filled with powder of talc 70. In a process of producing the spark plug 100, when the crimp portion 53 is bent inward and crimped, compressive force is applied to the buckle portion 58, and the buckle portion 58 is deformed (buckled) outward, whereby the metallic shell 50 is fixed to the insulator 10. The talc 70 is compressed in the crimping step, and the airtightness between the metallic shell 50 and the insulator 10 is thereby improved. The packing 8 is pressed between the outer-diameter decreasing portion 16 of the insulator 10 and the inner-diameter decreasing portion 56 of the metallic shell 50, and the gap between the metallic shell 50 and the insulator 10 is thereby sealed.

The ground electrode 30 is a metallic member and has a rod-shaped main body 37 and a tip portion 300 attached to a distal end portion 34 of the main body 37. Another end portion 33 of the main body 37 (referred to as a proximal end portion 33) is joined (e.g., resistance-welded) to the forward end surface 55 of the metallic shell 50. The main body 37 extends from the proximal end portion 33 joined to the metallic shell 50 in the forward end direction Df, is bent toward the center axis CL, and reaches the distal end portion 34. The tip portion 300 is fixed to the rearward direction Dfr side of the distal end portion 34. The gap g is formed between the tip portion 300 of the ground electrode 30 and the first tip 29 of the electrode 20. Specifically, the tip portion 300 of the ground electrode 30 is disposed on the forward direction Df side of the first tip 29 of the center electrode 20 and faces the first tip 29 through the gap g.

The right inset of FIG. 1 is an enlarged view of the tip portion 300. The enlarged view is a side view when the tip portion 300 is viewed in a direction perpendicular to the axial line CL. The tip portion 300 has a base portion 320 and a tip 310 joined to the base portion 320. In the present embodiment, the tip 310 has an approximately cylindrical shape and its center coincides with the axial line CL. The base portion 320 has a large-diameter portion 321 and a small-diameter portion 322 disposed on the rearward direction Dfr side of the large-diameter portion 321. Each of these portions 321 and 322 has an approximately cylindrical shape and its center coincides with the axial line CL. The outer diameter of the large-diameter portion 321 is larger than the outer diameter of the small-diameter portion 322. The outer diameter of the small-diameter portion 322 is approximately the same as the outer diameter of the tip 310. In the present embodiment, the tip 310 is laser-welded to a surface of the base portion 320 on the rearward direction Dfr side (specifically, a surface of the small-diameter portion 322 on the rearward direction Dfr side). A joint portion 330 in the figure is a portion joining the tip 310 and the base portion 320 together. During welding, part of the tip 310 and part of the base portion 320 are melted and then cooled and solidified to form the joint portion 330 (referred to also as a fused portion 330). A surface of tip 310 on the rearward direction Dfr side forms the gap g. A surface of the base portion 320 on the forward direction Df side is joined (e.g., resistance-welded) to the main body 37.

The main body 37 has an outer layer 31 and an inner layer 32 disposed on the inner circumferential side of the outer layer 31. The outer layer 31 is formed of a material (such as an alloy containing nickel as a main component) having higher oxidation resistance than the inner layer 32. The inner layer 32 is formed of a material (such as pure copper or an alloy containing copper as a main component) having a higher thermal conductivity than the outer layer 31. The inner layer 32 may be omitted.

The tip 310 of the tip portion 300 is formed using a material (e.g., a noble metal such as iridium (Ir) or platinum (Pt)) having higher durability against discharge than the main body 37. The base portion 320 of the tip portion 300 is formed of a material (such as an alloy containing nickel as a main component) having high oxidation resistance, as is the main body 37 (particularly the outer layer 31).

Figure 2:
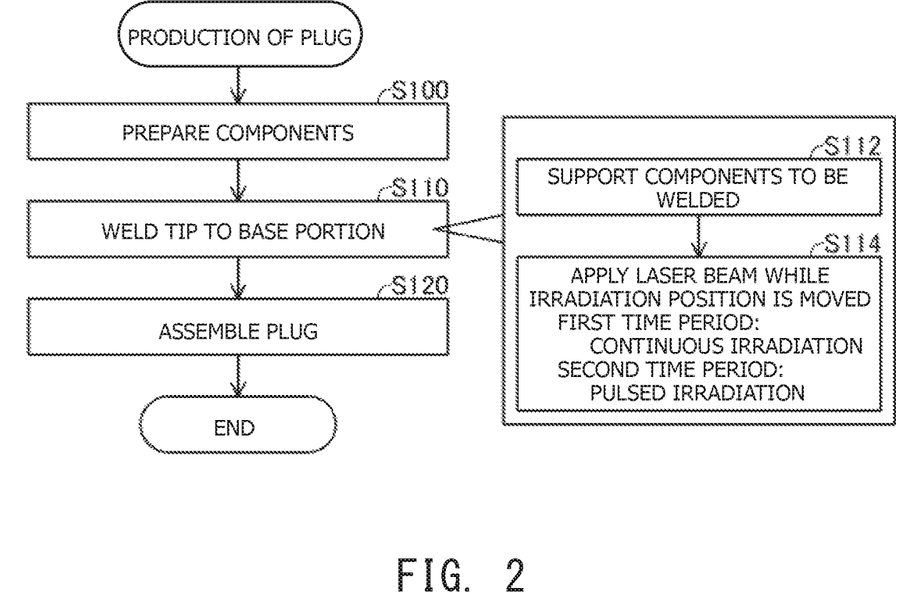
FIG. 2 is a flowchart showing an example of a method for producing the spark plug 100.

A-2. Method for Producing Plug:

FIG. 2 is a flowchart showing an example of a method for producing the spark plug 100. In S100, components of the spark plug 100 are prepared. For example, the metallic shell 50, the insulator 10, the center electrode 20, powder materials for the seal members 72 and 74 and the resistor 73, the metallic terminal 40, the rod-shaped main body 37 of the ground electrode 30, and the tip 310 and the base portion 320 of the tip portion 300 are prepared. To prepare these members, various well-known methods can be used (their detailed description will be omitted). For example, the unjoined tip 310 and the unjoined base portion 320 can be produced by various methods such as forging and cutting.

Figure 3:
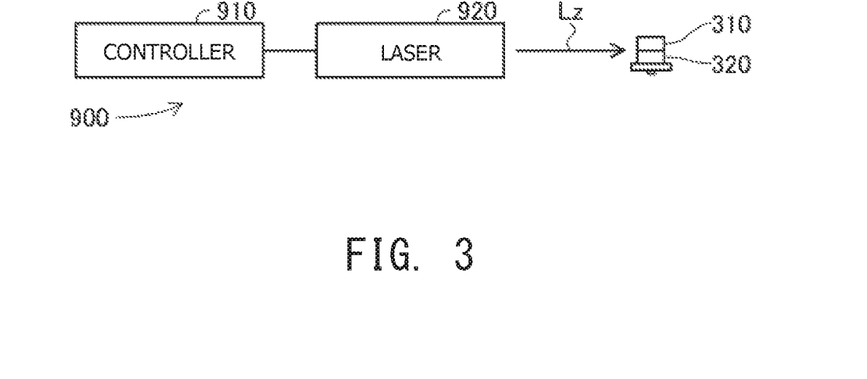
FIG. 3 is a schematic illustration of a welding system 900.

In S110, the tip 310 is welded to the base portion 320. FIG. 3 is a schematic illustration of a welding system 900 used to weld the tip 310 to the base portion 320. The welding system 900 includes a laser 920 that generates a laser beam Lz for welding and a controller 910 that controls the laser 920. The controller 910 is, for example, a computer including a processor (e.g., a CPU), a volatile memory (e.g., a RAM), and a nonvolatile memory (e.g., a flash memory). Programs are pre-stored in the nonvolatile memory. The processor operates according to the programs to control the laser 920. Execution of processing by the processor of the controller 910 is referred to also as execution of the processing by the controller 910.

Figure 4:
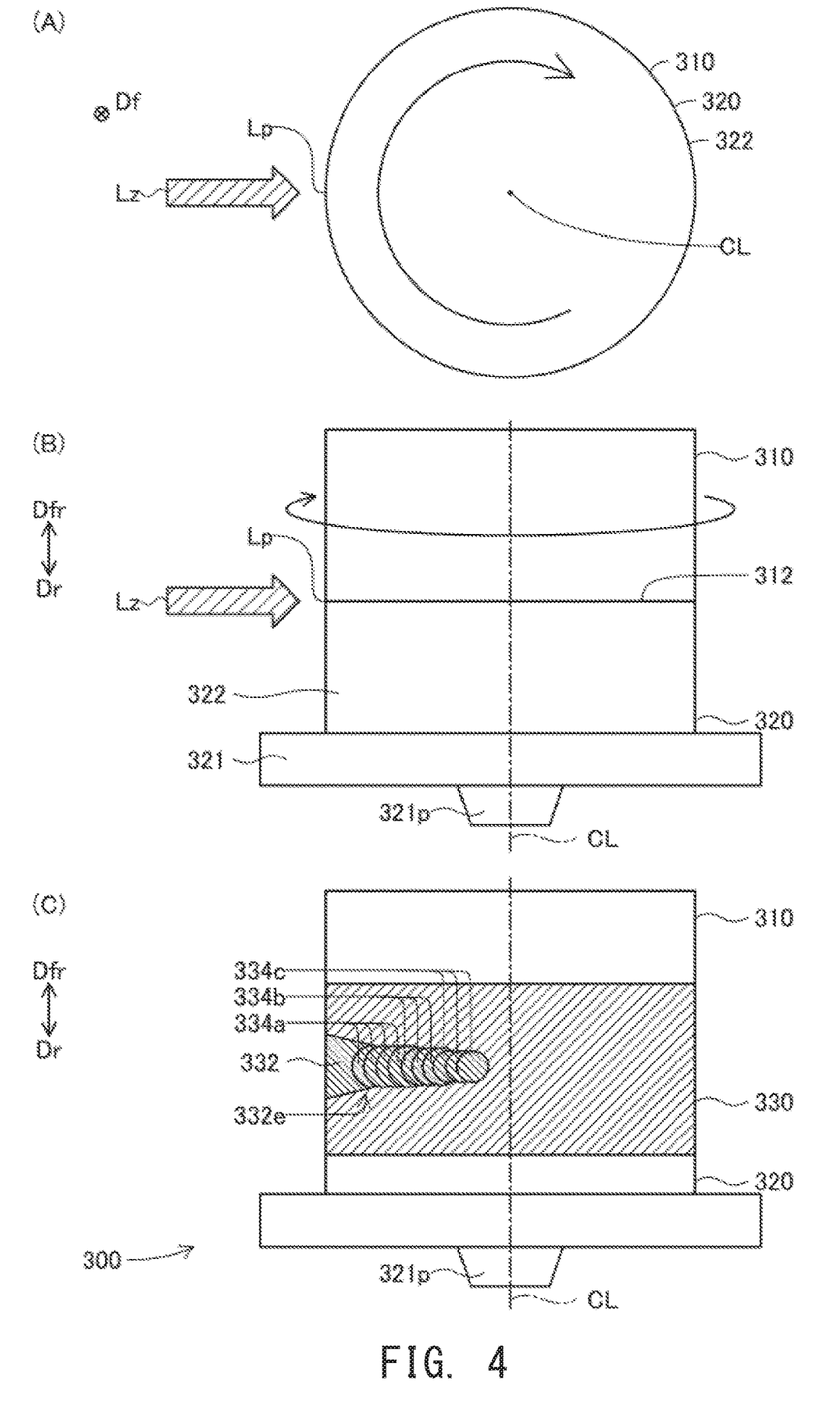
FIG. 4 is a set of illustrations used for describing welding.

S110 in FIG. 2 includes S112 and S114. In S112, the tip 310 (FIG. 1) and the base portion 320 are supported by an unillustrated supporting device. FIG. 4 is a set of illustrations used for describing welding. FIGS. 4(A) and 4(B) show the arrangement of the tip 310 and the base portion 320 during welding. The center axis CL and directions Df and Dfr in the figures represent the center axis CL and directions Df and Dfr, respectively, as viewed from the members 310 and 320 in the completed spark plug 100 (FIG. 1). Their positional relation will be described using the center axis CL and the directions Df and Dfr. FIG. 4(A) shows their appearance when they are viewed in a direction parallel to the center axis CL (specifically in the forward direction Df), and FIG. 4(B) shows their appearance when they are viewed in a direction perpendicular to the center axis CL. In FIG. 4(A), the illustration of the large-diameter portion 321 of the base portion 320 is omitted. As shown in FIG. 4(B), a protrusion 321p protruding in the forward direction Df is disposed in a central portion on the forward direction Df side of the large-diameter portion 321. In the present embodiment, the center axes of the tip 310 and the base portion 320 coincide with the center axis CL shown in FIGS. 4(A) and 4(B).

As illustrated, the tip 310 is placed on a surface of the base portion 320 on the rearward direction Dfr side. In S112 in FIG. 2, the tip 310 and the base portion 320 in the above state are supported by the unillustrated supporting device.

In S114 in FIG. 2, the interface 312 between the tip 310 (FIGS. 4(A) and 4(B)) and the base portion 320 is irradiated with the laser beam Lz. The interface 312 is a planar region at which the tip 310 and the base portion 320 are in contact with each other. In the present embodiment, the interface 312 on the outer circumferential surface of the tip 310 and the base portion 320 (the edge of the interface 312 in this case) is irradiated with the laser beam Lz. Portions of the tip 310 and the base portion 320 that are located in proximity to the irradiation position Lp of the laser beam Lz (particularly, portions extending from the irradiation position Lp in the traveling direction of the laser beam Lz) are melted by heat received from the laser beam Lz. A process of irradiating the interface 312 with the laser beam Lz while moving the irradiation position Lp of the laser beam Lz is performed (the detail of this process will be described later). In the present embodiment, the tip 310 and the base portion 320 are rotated about the center axis CL while the laser beam Lz is applied. The irradiation position Lp of the laser beam Lz thereby moves on the outer circumferential surface of the members 310 and 320 in the circumferential direction along the interface 312. Portions of the tip 310 and the base portion 320 that are located in proximity to the interface 312 are thereby melted and then cooled and solidified. Thus, welding is performed over the entire interface 312, whereby the tip 310 is joined to the base portion 320. In the present embodiment, the laser beam Lz is applied in a direction perpendicular to the center axis CL. However, the laser beam Lz may be inclined with respect to the center axis CL. Instead of rotating the members 310 and 320, the laser 920 (FIG. 3) may be moved around the members 310 and 320 to move the irradiation position Lp.

FIG. 4(C) is a schematic illustration of the tip 310 and the base portion 320 welded together (i.e., the tip portion 300). FIG. 4(C) shows their appearance when they are viewed in a direction perpendicular to the center axis CL, as does FIG. 4(B). As illustrated, the joint portion 330 is formed between the tip 310 and the base portion 320. Marks 332, 334a, 334b, and 334c showing portions irradiated with the laser beam Lz are formed on the surface of the joint portion 330 so as to be arranged in the circumferential direction. The mark 332 is a continuous mark extending in the circumferential direction (referred to as a continuous mark 332). Three types of marks 334a, 334b, and 334c are spot-shaped marks (referred to also as spot marks 334a, 334b, and 334c). As described later, these spot marks 334a, 334b, and 334c differ in size (e.g., maximum outer diameter). The size decreases in the order of marks 334a, 334b, and 334c.

In the example in FIG. 4(C), a plurality of spot marks 334a, a plurality of spot marks 334b, and a plurality of spot marks 334c are formed. The three types of spot marks 334a, 334b, and 334c are formed so as to be arranged from a boundary 322e between the continuous mark 332 and an adjacent spot mark in the circumferential direction in the order of spot marks 334a, 334b, and 334c. The reason why the continuous mark 332 and the plurality of spot marks 334a, 334b, and 334c are formed is that, during welding, the output conditions of the laser beam Lz are changed while the irradiation position of the laser beam Lz is moved.

Figure 5:
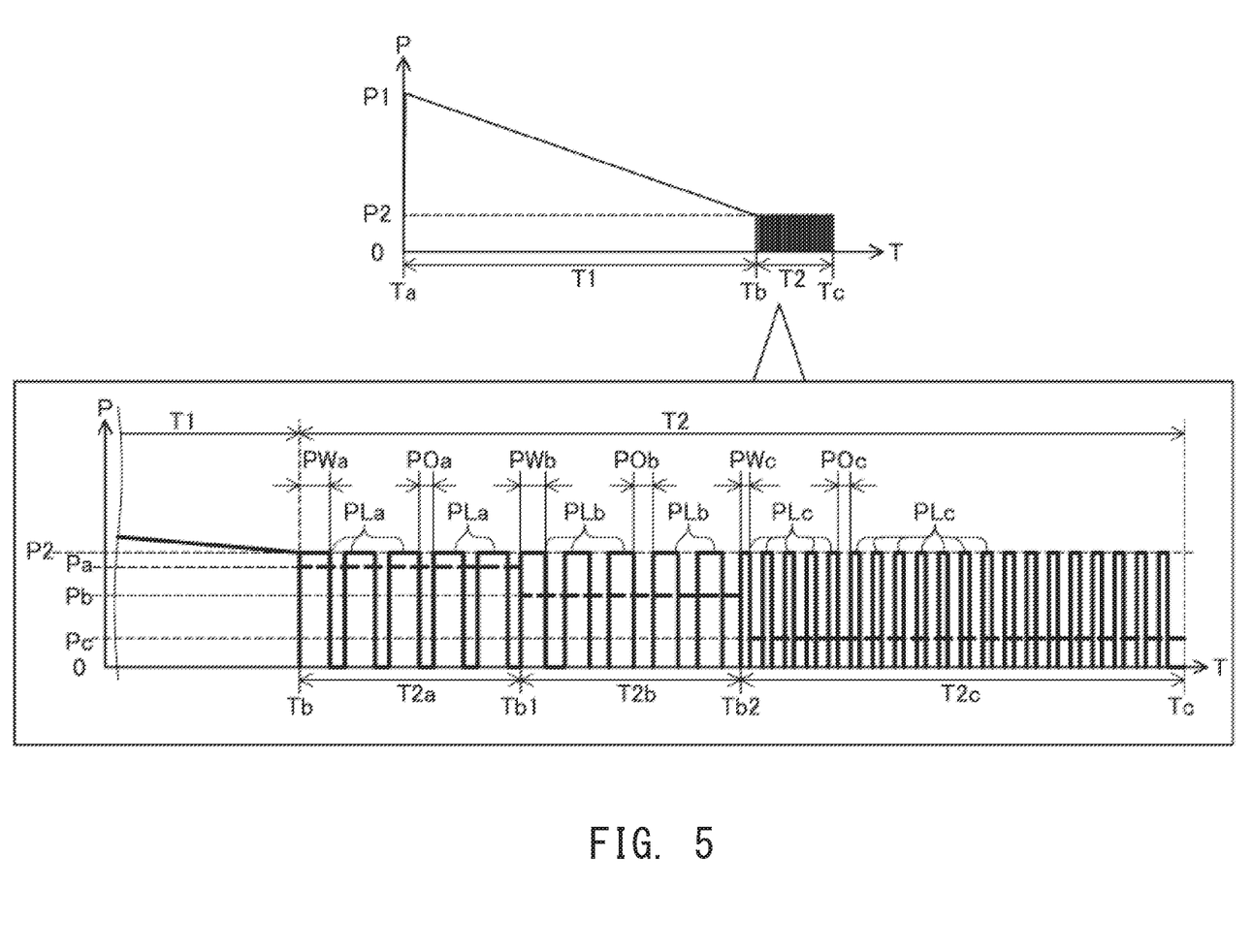
FIG. 5 is a graph showing changes in output conditions of a laser beam Lz.

FIG. 5 is a graph showing changes in the output conditions of the laser beam Lz during welding. The horizontal axis represents time T, and the vertical axis represents the output energy P per unit time of the laser beam Lz (which may be referred to simply as power P). The power P is represented by the output power (its unit is, for example, W) of the laser 920 (e.g., the output power of an unillustrated laser transmitter included in the laser 920). In the example in FIG. 5, the irradiation with the laser beam Lz is started at first time Ta and finished at third time Tc. During the period of time from the first time Ta to the third time Tc, the unillustrated supporting device rotates the tip 310 (FIGS. 4(A) and 4(B)) and the base portion 320 at least one turn at a constant angular velocity. The interface 312 between the tip 310 and the base portion 320 is thereby welded over its entire circumference.

The period of time from the first time Ta to the third time Tc is divided into a first period of time T1 from the first time Ta to second time Tb and a second period of time T2 from the second time Tb to the third time Tc. In the first period of time T1, the power P decreases gradually from a first power P1 to a second power P2. Here, P1>P2>zero. The first power P1 and the second power P2 are set to be within the power P range in which the laser 920 can stably output the laser beam Lz. For example, the first power P1 is the maximum power P that can be outputted, and the second power P2 is a power P that is about 10% of the first power P1. In the first period of time T1, the interface 312 (FIG. 4(B)) is continuously irradiated with the laser beam Lz, and the power P is reduced gradually.

The reason why the power P is reduced gradually is as follows. To join the tip 310 to the base portion 320 using the laser beam Lz (FIGS. 4(A) and 4(B)), the power P of the laser beam Lz is set to be large enough to melt the members 310 and 320. When this laser beam Lz is applied to the members 310 and 320, not only the temperature of the portion irradiated with the laser beam Lz but also the temperature of a portion therearound not irradiated with the laser beam Lz increase. In this state, the irradiation position Lp is moved, and a different irradiation position Lp is irradiated with the laser beam Lz. When the power P is constant, the members 310 and 320 may melt excessively. If the members 310 and 320 melt excessively, the molten members may spatter. As shown in the graph for the first period of time T1 in FIG. 5, by gradually decreasing the power P with time T (i.e., while the irradiation position Lp is moved), the members 310 and 320 can be melted appropriately irrespective of the irradiation position Lp. The continuous mark 332 in FIG. 4(C) is a mark formed by irradiation with the laser beam Lz in the first period of time T1.

The lower part of FIG. 5 shows an enlarged graph in the second period of time T2. In the second period of time T2, the power P is changed according to a pattern including a plurality of repeated pulses PLa, a plurality of repeated pulses PLb, and a plurality of repeated pulses PLc. In the present embodiment, the pulses PLa, PLb, and PLc are approximately rectangular pulses. As described above, in the second period of time T2, the laser beam Lz is applied to the interface 312 (FIG. 4(B)) a plurality of times according to the pulsed output pattern.

In the present embodiment, the second period of time T2 is divided into a sub-period of time T2a from the second time Tb to first intermediate time Tb1, a sub-period of time T2b from the first intermediate time Tb1 to second intermediate time Tb2, and a sub-period of time T2c from the second intermediate time Tb2 to the third time Tc. In the first sub-period of time T2a, the pulse PLa is repeated a plurality of times at a constant repetition period. In the middle sub-period of time T2b, the pulse PLb is repeated a plurality of times at a constant repetition period. In the last sub-period of time T2c, the pulse PLc is repeated a plurality of times at a constant repetition period. Time widths PWa, PWb, and PWc in the graph are time widths of single pulses PLa, PLb, and PLc, respectively (which are referred to also as pulse widths PWa, PWb, and PWc). Time widths POa, POb, and POc in the graph are time widths between adjacent ones of pulses PLa, PLb, and PLc in the sub-periods of time T2a, T2b, and T2c, respectively (which are referred to also as off time periods POa, POb, and POc). In the off time periods POa, POb, and POc between adjacent ones of pulses PLa, PLb, and PLc, the power P is zero.

The pulses PLa, PLb, and PLc have the same power P. In the present embodiment, the power P of each of the pulses PLa, PLb, and PLc is the second power P2, which is the power P at the end of the first period of time T1.

In the present embodiment, the pulse widths PWa, PWb, and PWc of the pulses PLa, PLb, and PLc differ from one another. Specifically, PWa>PWb>PWc>zero. As described above, the pulse width in a relatively late sub-period of time is narrower than the pulse width in a relatively early sub-period of time.

In the present embodiment, the duty ratio in a relatively late sub-period of time is smaller than the duty ratio in a relatively early sub-period of time. The duty ratio is the ratio of the period of time during which the laser beam Lz is ON (i.e., the pulse width) to the period of time of one cycle during which the laser beam Lz is turned on and off (i.e., the pulse width+the off time period). The duty ratio (PWb/(PWb+POb)) in the middle sub-period of time T2b is smaller than the duty ratio (PWa/(PWa+POa)) in the sub-period of time T2a prior to the middle sub-period of time T2b, and the duty ratio (PWc/(PWc+POc)) in the last sub-period of time T2c is smaller than the duty ratio (PWb/(PWb+POb)) in the sub-period of time T2b prior to the last sub-period of time T2c.

Average powers Pa, Pb, and Pc in the graph represent the time averages of the powers P in the sub-periods of time T2a, T2b, and T2c, respectively. As described above, in the present embodiment, the time width of pulses in a relatively late sub-period of time is smaller than the time width of pulses in a relatively early sub-period of time. The duty ratio in a relatively late sub-period of time is smaller than the duty ratio in a relatively early sub-period of time. The average of the power P in a relatively late sub-period of time is smaller than the average of the power P in a relatively early sub-period of time. Specifically, P2>Pa>Pb>Pc>zero. In the second period of time T2, the average of the power P decreases as the time T elapses. As described above, in the second period of time T2, the irradiation position Lp is moved, and the average of the power P decreases as the time T elapses. Therefore, in the second period of time T2 also, excessive melting of the members 310 and 320 can be prevented irrespective of the irradiation position Lp. The average powers Pa, Pb, Pc in the second period of time T2 are smaller than the second power P2 at the end of the first period of time T1. Therefore, excessive melting of the members 310 and 320 can be prevented over the entire first and second periods of time T1 and T2. The plurality of the spot marks 334a, 334b, and 334c in FIG. 4(C) are marks formed by the pulsed laser beam Lz in the sub-periods of time T2a, T2b, and T2c, respectively.

A program for the controller 910 (FIG. 3) is pre-configured so as to control the power P as shown in the graph in FIG. 5. The controller 910 controls the power P of the laser beam Lz outputted from the laser 920 according to this program in the manner shown in the graph in FIG. 5. Therefore, the welding system 900 can appropriately weld the tip 310 to the base portion 320. S114 in FIG. 2, i.e., S110, is thereby completed.

In S120 in FIG. 2, the prepared components are used to assemble the spark plug 100. For example, first, an assembly composed of the insulator 10, the center electrode 20, and the metallic terminal 40 is produced. For example, the center electrode 20 is inserted from an opening of the insulator 10 on the rearward direction Dfr side. The center electrode 20 is supported by the inner-diameter decreasing portion 11 of the insulator 10 and is thereby disposed in a prescribed position in the through hole 12. Next, the powders of the materials of the first seal member 72, the resistor 73, and the second seal member 74 are charged and compacted in the order of the members 72, 73, and 74. The powders of the materials are charged into the through hole 12 from the opening of the insulator 10 on the rearward direction Dfr side. Next, the insulator 10 is heated to a prescribed temperature higher than the softening point of the glass component contained in the powders of the materials of the members 72, 73, and 74. With the insulator 10 heated to the prescribed temperature, the shaft portion 41 of the metallic terminal 40 is inserted into the through hole 12 from the opening of the insulator 10 on the rearward direction Dfr side. The powders of the materials of the members 72, 73, and 74 are thereby compressed and sintered, and the members 72, 73, and 74 are formed. The metallic terminal 40 is thereby fixed to the insulator 10.

The tip portion 300 is joined to the rod-shaped main body 37 of the ground electrode 30. In the present embodiment, a portion of the tip portion 300 on the forward direction Df side (specifically, a surface of the base portion 320 (FIG. 4(B)) on the forward direction Df side) is resistance-welded to the main body 37. As described using FIG. 4(B), the protrusion 321p is disposed at the center of the surface of the tip portion 300 on the forward direction Df side. During welding, the welding proceeds from the contact portion between the protrusion 321p of the tip portion 300 and the main body 37 (i.e., the central portion of the surface of the tip portion 300 on the forward direction Df side). This can prevent an unwelded portion from remaining between the tip portion 300 and the main body 37. The proximal end portion 33 of the main body 37 is joined to the metallic shell 50 (by, for example, resistance welding).

Next, the assembly including the insulator 10 is fixed to the metallic shell 50. Specifically, the forward end-side packing 8, the assembly, the ring member 62, the talc 70, and the ring member 61 are disposed inside the through hole 59 of the metallic shell 50. Then the crimp portion 53 of the metallic shell 50 is crimped so as to be bend inward, and the insulator 10 is thereby fixed to the metallic shell 50. Then the rod-shaped ground electrode 30 is bent to adjust the length of the gap g. The spark plug 100 is thereby completed.

As described above using FIGS. 2, 4, and 5, in the present embodiment, the welding of the tip 310 to the base portion 320 (FIG. 2: S110) includes continuous irradiation with the laser beam Lz in the first period of time T1 (FIG. 5) while the irradiation position Lp of the laser beam Lz is moved. In this case, the change in the power P in the first period of time T1 is not steeper than that when the interface 312 (FIG. 4(B)) is irradiated with a pulsed laser beam Lz a plurality of times, and steep changes in the temperatures of the members 310 and 320 in the first period of time T1 can be prevented. Therefore, the occurrence of a problem (such as cracking) in the joint portion 330 between the tip 310 and the base portion 320 can be prevented.

In the second period of time T2 subsequent to the first period of time T1, the laser beam Lz is applied a plurality of times according to the pulsed output pattern while the irradiation position Lp of the laser beam Lz is moved. Therefore, the average output energy per unit time can be reduced without excessively reducing the output energy P per unit time of the pulsed laser beam Lz. This can prevent excessive melting of the members 310 and 320. In the second period of time T2, since it is unnecessary to excessively reduce the output energy P per unit time of the pulsed laser beam Lz, it is possible to prevent the laser beam Lz from becoming instable. Therefore, the tip can be appropriately welded to the base portion through use of the laser beam Lz.

If the welding in the second period of time T2 is omitted, the power P of the laser beam Lz can decrease steeply from the second power P2 to zero. When the power P decreases steeply as described above, the temperatures of the molten portions of the members 310 and 320 decrease steeply, so that a crack may be formed in the joint portion 330. In the present embodiment, the laser beam Lz is applied in the second period of time T2 such that the average output energy per unit time is smaller than the second power P2, so that a rapid reduction in the temperature of the members 310 and 320 can be prevented. Therefore, the formation of a crack in the joint portion 330 can be prevented.

The welding of the tip 310 to the base portion 320 (FIG. 2: S110) includes changing the output conditions of the laser beam Lz, while moving the irradiation position Lp of the laser beam Lz, in the first period of time T1 (FIG. 5). Specifically, in the first period of time T1, while the laser beam Lz is applied continuously, the power P of the laser beam Lz is reduced gradually. This can prevent excessive melting of the members 310 and 320.

The first period of time T1 includes a period of time in which the power P of the laser beam Lz is reduced gradually, and this period of time (the entire first period of time T1 in the embodiment in FIG. 5) is continuous with the second period of time T2. As described above, in at least a relatively late part of the first period of time T1 (i.e., its partial period of time continuous with the second period of time T2), the power P decreases gradually. Therefore, although energy is further supplied to the members 310 and 320 in a state in which melting of the members 310 and 320 has progressed as a result of the irradiation with the laser beam Lz in a relatively early part of the first period of time T1, the amount of energy further supplied to the members 310 and 320 is prevented from becoming excessively large. This can prevent excessive melting of the members 310 and 320.

The second period of time T2 is divided into the sub-periods of time T2a, T2b, and T2c. The average of the power P of the laser beam Lz in a relatively late sub-period of time is smaller than the average of the power P of the laser beam Lz in a relatively early sub-period of time (specifically, Pa>Pb>Pc). Since the average of the power P decreases as the time T elapses as described above, excessive melting of the members 310 and 320 can be prevented.

The power P of the laser beam Lz in the second period of time T2 is equal to the power P at the end of the first period of time T1 (specifically, the second power P2). If the power P of the pulsed laser beam Lz in the second period of time T2 is larger than the power P2 at the end of the first period of time T1, the irradiation with the pulsed laser beam Lz with a large power P may cause molten portions of the members 310 and 320 to spatter. However, in the present embodiment, this problem can be prevented. If the power P of the pulsed laser beam Lz in the second period of time T2 is smaller than the power P2 at the end of the first period of time T1, the laser beam Lz may become unstable. However, in the present embodiment, this problem can be prevented.

The second period of time T2 is divided into the sub-periods of time T2a, T2b, and T2c. The pulse width of the laser beam Lz in a relatively late sub-period of time is narrower than the pulse width of the laser beam Lz in a relatively early sub-period of time. Therefore, the average of the power in the relatively late sub-period of time can be easily reduced to be smaller than the average of the power in the relatively early sub-period of time.

In the schematic illustration in FIG. 4(C), the spot marks 334a, 334b, and 334c are marks formed in the sub-periods of time T2a, T2b, and T2c, respectively. The larger the pulse width, the larger the size (e.g., the maximum outer diameter) of the spot marks 334a, 334b, and 334c. In the present embodiment, the size decreases in the order of the marks 334a, 334b, and 334c. The boundary 322e between the continuous mark 332 and an adjacent spot mark 334a indicates transition from the first period of time T1 to the second period of time T2.

The width of the continuous mark 332 (the width in a direction parallel to the axial line CL) gradually decreases toward the spot marks 334a. This is because, in the first period of time T1, the power P gradually decreases as the time T elapses. The width of the continuous mark 332 at the boundary 322e between the continuous mark 332 and a spot mark 334a is approximately the same as the maximum outer diameter of the spot mark 334a. This is because the power P at the end of the first period of time T1 is equal to the power P of the pulsed laser beam Lz in the sub-period of time T2a subsequent to the first period of time T1.

The actual total numbers of spot marks 334a, 334b, and 334c are the same as the total numbers of pulses in the sub-periods of time T2a, T2b, and T2c, respectively. In FIG. 4(C), the illustration of the plurality of spot marks 334a, 334b, and 334c is simplified, and the numbers of spot marks 334a, 334b, and 334c are smaller than the numbers in the pattern in FIG. 5. In the example in FIG. 4(C), spot marks 334a, 334b, and 334c overlap their adjacent spot marks 334a, 334b, and 334c. When the repetition period of pulses is long, spot marks 334a, 334b, and 334c are formed so as to be spaced apart from each other.

In a relatively late sub-period of time, since the pulse width of the laser beam Lz is narrow, the repetition period of the irradiation with the pulsed laser beam Lz can be reduced without increasing the average of the output energy per unit time. Therefore, the off time period between pulses of the laser beam Lz during which the laser beam Lz is not applied is prevented from increasing, so that the distance between adjacent spot-shaped irradiation positions Lp of the pulsed laser beam Lz is prevented from increasing. This can prevent insufficient melting of the members 310 and 320 in regions between adjacent irradiation positions Lp.

For example, in the embodiment in FIG. 5, the repetition period (PWc+POc) of the pulses PLc in the sub-period of time T2c is shorter than the repetition periods of pulses in the sub-periods of time prior to the sub-period of time T2c (e.g., the repetition period (PWa+POa) in the sub-period of time T2a and the repetition period (PWb+POb) in the sub-period of time T2b). This can prevent the occurrence of joint failure due to insufficient melting in portions of the members 310 and 320 (FIG. 4(B)) that are welded by irradiation with the laser beam Lz in the sub-period of time T2c. In particular, in the embodiment in FIG. 5, the off time period POc in the sub-period of time T2c is shorter than the off time periods in sub-periods of time prior to the sub-period of time T2c (e.g., the off time period POa in the sub-period of time T2a and the off time period POb in the sub-period of time T2b). This can appropriately prevent the occurrence of a problem in portions of the members 310 and 320 (FIG. 4(B)) that are welded by the irradiation with the laser beam Lz in the sub-period of time T2c.

B. Second Embodiment

Figure 6:
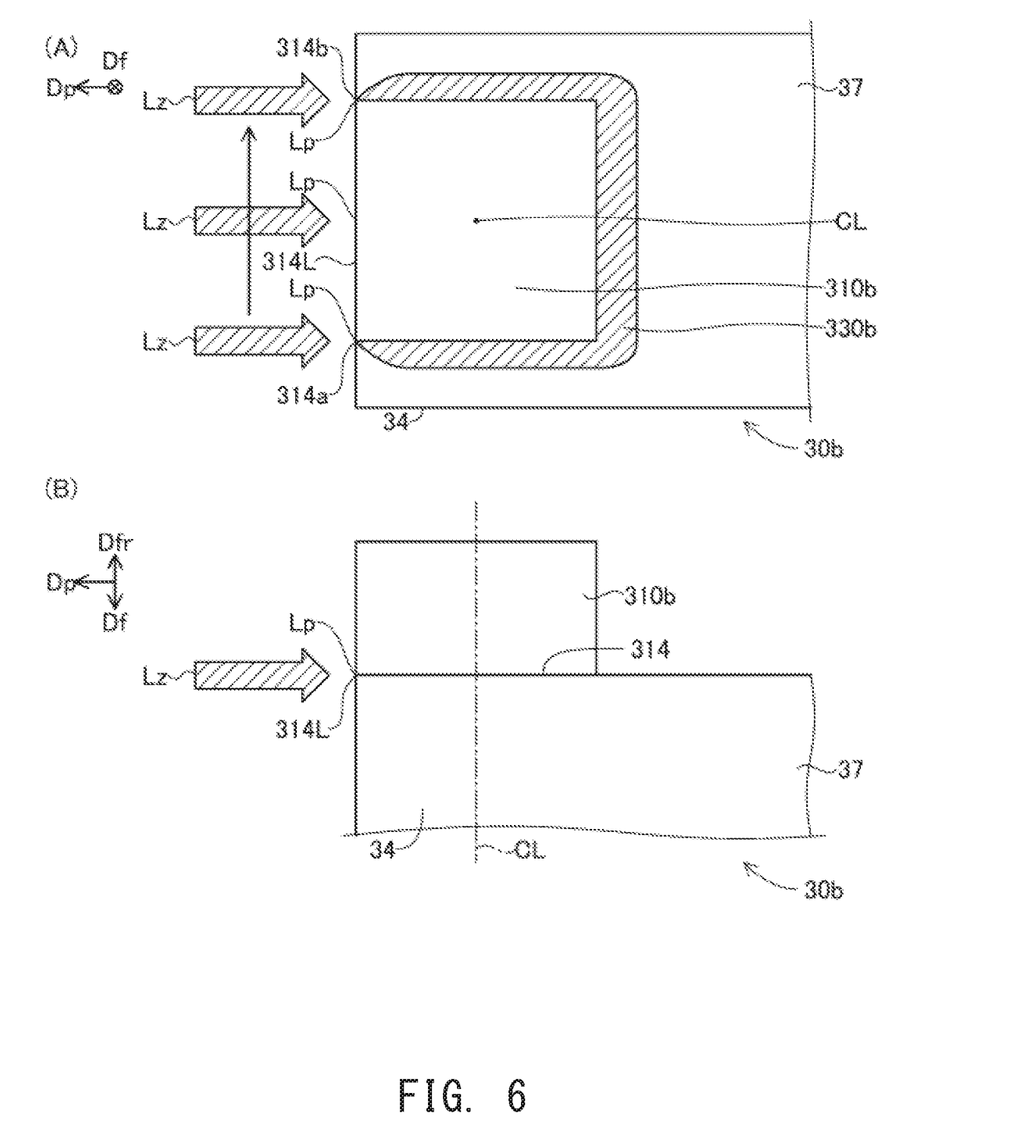
FIG. 6 is a pair of illustrations used for describing another embodiment of a ground electrode.

FIG. 6 is a pair of illustrations used for describing another embodiment of the ground electrode. A forward end portion of a ground electrode 30b is shown in FIG. 6. The ground electrode 30b can be used instead of the ground electrode 30 of the spark plug 100 in FIG. 1. A center axis CL and directions Df and Dfr in the figures represent the center axis CL and directions Df and Dfr, respectively, as viewed from the distal end portion 34 of the main body 37 of the ground electrode 30b in the completed spark plug 100. Their positional relation will be described using the center axis CL and the directions Df and Dfr. FIG. 6(A) shows their appearance when they are viewed in a direction parallel to the center axis CL (specifically in the forward direction DO, and FIG. 6(B) shows their appearance when they are viewed in a direction perpendicular to the center axis CL. In the present embodiment, instead of the tip portion 300 (FIG. 1), a tip 310b is welded to the rearward direction Dfr side of the distal end portion 34 of the main body 37. The tip 310b is an approximately rectangular member whose center coincides with the center axis CL and is formed using a material (e.g., a noble metal such as iridium (Ir) or platinum (Pt)) having higher durability against discharge than the main body 37. The structures of other portions of the ground electrode 30b are the same as the structures of the corresponding portions of the ground electrode 30 in FIG. 1 (their detailed description will be omitted).

A method for producing the spark plug 100 including the ground electrode 30b is the same as the method described using FIG. 2 except for the processing in S110 (FIG. 2). In S110, the tip 310b is welded to the main body 37. In the present embodiment, the main body 37 corresponds to a base portion to which the tip 310b is fixed.

When the tip 310b is welded to the main body 37, the tip 310b is placed on the rearward direction Dfr side of the distal end portion 34 of the main body 37, as shown in FIG. 6(B). In S112 in FIG. 2, the unillustrated supporting device supports the tip 310b and the main body 37 in the above state. In S114, the welding system 900 (FIG. 3) irradiates the interface 314 between the tip 310b and the main body 37 with the laser beam Lz. The laser beam Lz is applied in a direction opposite to an extending direction Dp of the distal end portion 34 of the main body 37. Then the laser beam Lz is moved in a direction perpendicular to the direction Dp such that the irradiation position Lp (FIG. 6(A)) of the laser beam Lz scans the entire edge 314L of the interface 314 on the direction Dp side from one end 314a of the edge 314L to its opposite end 314b. Thus, welding is performed over the entire interface 314, and a joint portion 330b (FIG. 6(A)) that joins the tip 310b and the main body 37 together is formed. The tip 310b is thereby joined to the main body 37. As described above, in the present embodiment, the members 310b and 37 to be welded are not moved, but the laser beam Lz is moved.

In the present embodiment also, the controller 910 (FIG. 3) controls the laser 920 according to the graph illustrated in FIG. 5. Therefore, in the present embodiment also, the advantages described using FIG. 5 can be achieved. For example, since the power P of the laser beam Lz decreases as the time T elapses, excessive melting of the members 310b and 37 can be prevented.

C. Modifications (1) The method for welding the tip to the base portion is not limited to the above-described method, and any of various methods in which the laser beam Lz is applied while the irradiation position Lp of the laser beam Lz is moved can be used. The embodiment described using the graph in FIG. 5 is not a limitation, and various embodiments including the first period of time and the second period of time subsequent to the first period of time can be used. In the first period of time, the laser beam Lz is applied continuously while the irradiation position Lp is moved. In the second period of time, while the irradiation position Lp is moved, the laser beam Lz is applied a plurality of times according to the pulsed output pattern. Specifically, the laser beam Lz is repeatedly turned on (applied) and off (not applied) a plurality of times.

For example, the following modifications may be used as the method for welding the tip to the base portion. The first period of time T1 during which the laser beam Lz is applied continuously includes a specific period of time during which the power P decreases gradually. This specific period of time may be at least part of the first period of time T1. The specific period of time may be the entire first period of time T1 or may be part of the first period of time T1. For example, the specific period of time may be a partial period of time including the start time of the first period of time T1 (i.e., a relatively early partial period of time), may be a partial period of time continuous with the second period of time T2 (i.e., a relatively late period of time), or may be a partial period of time after the start time of the first period of time T1 and before the start time of the second period of time T2. In any case, it is preferable that, in a period of time within the first period of time T1 that differs from the specific period of time, the power P does not increase and is constant. In this manner, excessive melting of the base portion and the tip can be prevented. However, in the period of time in the first period of time T1 that differs from the specific period of time, the power P may increase as the time T elapses.

In the specific period of time in the first period of time T1, the power P may decrease linearly or in a curve as the time T elapses. As described above, the power P may decrease continuously as the time T elapses. Alternatively, the power P may decrease stepwise as the time T elapses. In any case, when the power P is not zero, does not increase, and decreases at a plurality of timings in the specific period of time in the first period of time T1, it can be said that the power P gradually decreases in the specific period of time.

The power P of the pulsed laser beam Lz in the second period of time T2 may be larger or smaller than the power P of the laser beam Lz at the end of the first period of time T1 (the second power P2 in the example in FIG. 5). In the second period of time T2, the power P of the pulsed laser beam Lz may vary as the time T elapses. For example, the power P of pulses in a relatively late stage may be smaller than the power P of pulses in a relatively early stage. The shape of a single pulse (referred to also as its waveform) is not limited to a rectangular shape and may be a curved or zigzag shape that is represented by a line indicating that the power P varies as the time T elapses. In any case, the maximum power of a single pulse may be used as the power P of the single pulse. The width at one half of the maximum power (referred to also as the full width at half maximum) may be used as the pulse width of the single pulse.

Another period of time may be provided before the first period of time T1. For example, in the period of time prior to the first period of time T1, the interface between the tip and the base portion may be irradiated with the laser beam Lz a plurality of times according to a pulsed output pattern while the irradiation position Lp is moved.

In the embodiment in FIG. 5, in the second period of time T2, the pulse width changes between the two sub-periods of time T2a and T2b and changes between the two sub-periods of time T2b and T2c. As described above, the pulse width changes twice in the second period of time T2. The number of changes in pulse width in the second period of time T2 is not limited to two and may be one or three or more. When a partial period of time including at least one continuous pulse with a constant pulse width is specified as one fixed-width pulse period of time, the second period of time T2 may contain N fixed-width pulse periods of time (N is an integer of 2 or more). The pulse width may vary gradually as the time T elapses. In any case, it is preferable that the pulse width in a relatively late partial period of time in the second period of time T2 is narrower than the pulse width in a relative early partial period of time. In this configuration, the average of the power P can be easily reduced as the time T elapses, and therefore excessive melting of the tip and the base portion can be prevented. However, the pulse width in a relatively late partial period of time may be wider than the pulse width in a relatively early partial period of time. Alternatively, the pulse width may be constant over the entire second period of time T2. The repetition period at which the pulsed laser beam Lz is output (i.e., the repetition period of the pulses) may vary as the time T elapses. The repetition period of the pulses may be constant over the entire second period of time T2.

In the second period of time T2 in the embodiment in FIG. 5, a continuous partial period of time in which the average of the power P of the laser beam Lz is constant is the same as a continuous partial period of time in which the pulse width of the laser beam Lz is constant (specifically each of the three sub-periods of time T2a, T2b, and T2c). However, the average of the power P may vary independently of the change in the pulse width. For example, a continuous partial period of time in which the average of the power P is constant may differ from a continuous partial period of time in which at least one pulse with a constant pulse width is present. The power P and the pulse width may be constant over the entire second period of time T2, and the magnitude relation between the off time periods POa, POb, and POc in the sub-period of time T2a, T2b, and T2c may be POa<POb<POc. In this case, the average of the power P decreases in the order of the sub-periods of time T2a, T2b, and T2c.

In the embodiment in FIG. 5, the average of the power P is changed twice, as is the pulse width. The number of times the average of the power P changes is not limited to two and may be one or three or more. The average of the power P may vary gradually as the time T elapses. For example, the power P and the pulse width may be constant over the entire second period of time T2, and the off time period may increase as the time T elapses. In any case, it is preferable that in the second period of time T2, the average of the power P in a relatively late partial period of time is smaller than the average of the power P in a relatively early partial period of time. In this configuration, the average of the power P can be reduced as the time T elapses, so that excessive melting of the tip and the base portion can be prevented.

Preferably, the second period of time T2 does not include a period of time in which the average of the power P increases and includes at least one of a period of time in which the average of the power P is constant and a period of time in which the average of the power P decreases. Specifically, it is preferable that, in the second period of time T2, the output conditions of the laser beam Lz are controlled such that the average of the power P does not increase with time and is at least either maintained at a constant value or reduced. Various methods can be used to control the output conditions for changing the average of the power P. To reduce the average of the power P, for example, the power P may be reduced, the pulse width may be reduced, or the off time period may be increased.

In any case, it is preferable that the power P at the end of the first period of time T1 is a minimum value in an adjustable range of the power P in which the laser 920 (FIG. 3) can stably output the laser beam Lz (this range is hereinafter referred to as a stable range). In this configuration, the power P can be reduced in the first period of time T1 by effectively using the stable range of the power P of the laser 920. Therefore, excessive melting of the tip and the base portion can be appropriately prevented. However, the power P at the end of the first period of time T1 may be larger than the minimum value in the stable range. Generally, to stabilize the irradiation with the laser beam Lz, it is preferable that the power P at the end of the first period of time T1 is equal to or larger than the minimum value in the stable range.

Preferably, the power P of the pulsed laser beam Lz in the second period of time T2 is the minimum value in the stable range of the power P of the laser 920. This configuration can prevent the occurrence of problems caused by the high power P of the pulsed laser beam Lz (e.g., the formation of a crack due to an abrupt temperature change, spattering of molten materials caused by the irradiation with the laser beam Lz with a high power P, etc.) while preventing the application of the laser beam Lz in the second period of time T2 from becoming instable. However, the power P of the laser beam Lz in the second period of time T2 may be larger than the minimum value in the stable range. Generally, to stabilize the irradiation with the laser beam Lz, it is preferable that the power P of the pulsed laser beam Lz in the second period of time T2 is equal to or larger than the minimum value in the stable range. In any case, the power P of the pulsed laser beam Lz in the second period of time T2 may be equal to the power P at the end of the first period of time T1 or may be larger or smaller than the power P at the end of the first period of time T1.

Preferably, the output conditions in the second period of time T2 (e.g., the repetition period of the pulses, the pulse width, and the power P of the irradiation laser beam Lz) are set such that the average output energy per unit time in the second period of time T2 is equal to or less than the output energy P per unit time at the end of the first period of time T1. In this configuration, excessive melting of the tip and the base portion in the second period of time T2 can be prevented. Preferably, the output conditions in the second period of time T2 are set such that the average output energy per unit time decreases as the time T elapses. For example, the output conditions may be set such that the average output energy per unit time decreases stepwise in a plurality of sub-periods of time included in the second period of time T2.

(2) The base portion to which the tip is welded may be any of various members other than a base such as the base portion 320 in FIG. 3 and a rod member such as the main body 37 in FIG. 6. To weld the tip of the center electrode (e.g., to weld together the first tip 29 and the rod portion 28 of the center electrode 20 in FIG. 1), a method including the first period of time and the second period of time may be used. In the first period of time, while the irradiation position Lp of the laser beam Lz is moved, the laser beam Lz is applied continuously. In the second period of time, while the irradiation position Lp is moved, the laser beam Lz is applied a plurality of times according to the pulsed output pattern. The material of the tip is not limited to a material containing a noble metal (e.g., platinum) and may be any of various other materials. The material of the base portion to which the tip is welded is not limited to a material containing nickel and may be any of various other materials.

(3) To move the irradiation position Lp of the laser beam Lz, various methods can be used. A method in which the laser beam Lz is not moved but the tip and the base portion (e.g., the tip 310 and the base portion 320) are moved may be used, as in the embodiment in FIG. 4(A). A method in which the tip and the base portion (e.g., the tip 310b and the main body 37) are not moved but the laser beam Lz is moved may be used, as in the embodiment in FIG. 6(A). Alternatively, a method in which both a member composed of the tip and the base portion and the laser beam Lz are moved may be used. The laser beam Lz may be applied over the entire circumferential edge of the interface (e.g., the interface 312) between the tip and the base position, as in the embodiment in FIG. 4(A). The laser beam Lz may be applied to only part of the edge of the interface (e.g., the interface 314) between the tip and the base portion, as in the embodiment in FIG. 6(A). In any case, it is preferable that the laser beam Lz has a power P sufficient to perform welding over the entire interface.

(4) Instead of the laser beam, various energy beams such as electron beams that can melt portions of the tip and the base portions irradiated with the beams can be used as the beam for welding the tip. In any case, marks remain in the portions irradiated with the energy beam on the outer surface of the joint portion between the tip and the base portion. When the continuous mark and spot marks (e.g., the continuous mark 332 and the spot marks 334a, 334b, and 334c) are formed, as in the embodiment in FIG. 4(C), it can be inferred that the welding has been performed while the irradiation position of the energy beam is moved and the output conditions are changed (specifically, the welding has been performed using continuous irradiation with the energy beam and irradiation with a pulsed energy beam repeated a plurality of times). When the size (the maximum outer diameter) of a spot mark located relatively far from the boundary between the continuous mark and its adjacent spot mark is smaller than the size of a spot mark located relatively close to the boundary between the continuous mark and its adjacent spot mark, it can be inferred that in the period of time during which the pulsed laser beam Lz is used, the pulse width in a relatively late sub-period of time is narrower than the pulse width in a relatively early sub-period of time.

(5) To produce the spark plug 100, any of various methods may be used instead of the method described in FIG. 2. For example, the step of joining the ground electrode 30 to the metallic shell 50 may be performed after the assembly including the insulator 10, the center electrode 20, and the metallic terminal 40 is fixed to the metallic shell 50. The step of joining the tip portion 300 to the main body 37 may be performed after the main body 37 is joined to the metallic shell 50.

(6) Instead of the structure described with reference to FIG. 1, various other structures may be used as the structure of the spark plug. For example, a side surface of the center electrode (a surface on a side located in a direction perpendicular to the axial line CL) and the ground electrode may form a gap for discharge. The spark plug may have two or more discharge gaps. The resistor 73 may be omitted. A magnetic material may be disposed between the center electrode 20 and the metallic terminal 40 within the through hole 12 of the insulator 10.

(7) The controller 910 in FIG. 3 may be incorporated into the laser 920 (i.e., a device that outputs an energy beam). In each of the above embodiments, part of components implemented by hardware may be replaced by software. On the contrary, part or all of components implemented by software may be replaced by hardware. For example, the function for changing the output conditions of the energy beam may be realized by a dedicated hardware circuit.

When part or all of the functions in the present invention are realized by computer programs, the programs may be provided in a state in which the programs are stored in a computer-readable recording medium (e.g., a non-volatile recording medium). The programs may be used while being stored in the recording medium used to provide the programs or being stored in a different recording medium (computer-readable recording medium). The "computer-readable recording medium" is not limited to a portable recording medium such as a memory card or a CD-ROM and is intended to encompass internal storage devices such as ROMs in the computer and external storage devices such as hard disk drives connected to the computer.

Although the present invention has been described on the basis of the embodiments and modifications thereof, the embodiments of the present invention are provided for facilitating an understanding of the present invention and do not limit the scope of the present invention. The present invention may be changed and improved without departing from the scope of the present invention and encompasses equivalents thereof.

DESCRIPTION OF REFERENCE NUMERALS AND SYMBOLS 8 forward end-side packing
10 insulator
11 inner-diameter decreasing portion
12 axial hole (through hole)
13 rear trunk portion
14 large-diameter portion
15 forward trunk portion
16 outer-diameter decreasing portion
19 leg portion
20 center electrode
21 outer layer
22 core
23 flange portion
24 head portion
27 shaft portion
28 rod portion
29 first tip
30, 30b ground electrode
31 outer layer
32 inner layer
33 proximal end portion
34 distal end portion
37 main body
40 metallic terminal
41 shaft portion
48 flange portion
49 cap attachment portion
50 metallic shell
51 tool engagement portion
52 trunk portion
53 crimp portion
54 flange portion
55 forward end surface
56 inner-diameter decreasing portion
57 threaded portion
58 buckle portion
59 through hole
61, 62 ring member
70 talc
72 first seal member
73 resistor
74 second seal member
90 gasket
100 spark plug
300 tip portion
310, 310b tip
312, 314 interface
314L edge
314a, 314b end
320 base portion
321 large-diameter portion
321p protrusion
322 small-diameter portion
330, 330b joint portion (fused portion)
332 continuous mark
332e interface
334a, 334b, 334c spot mark
900 welding system
910 controller
920 laser
g gap
CL center axis (axial line)
Df forward end direction (forward direction)
Dfr rearward end direction (rearward direction)
Dp direction
Lp irradiation position
Lz laser beam Having described the invention, the following is claimed:

1. A method for producing a spark plug including an electrode having a base portion and a tip fixed to the base portion, the method comprising:
   welding the tip to the base portion by irradiating an interface between the base portion and the tip with an energy beam, wherein the welding the tip to the base portion includes:
      applying the energy beam continuously, while moving an irradiation position of the energy beam, in a first period of time, and
      applying the energy beam a plurality of times according to a pulsed output pattern, while moving the irradiation position of the energy beam, in a second period of time subsequent to the first period of time.

2. A method for producing a spark plug according to claim 1, wherein, in a specific period of time which is at least part of the first period of time, the output energy per unit time of the energy beam is gradually reduced.

3. A method for producing a spark plug according to claim 2, wherein the specific period of time is a period of time continuous with the second period of time.

4. A method for producing a spark plug according to claim 1, wherein the second period of time includes a first partial period of time and a second partial period of time subsequent to the first partial period of time, and
   wherein the average of the output energy per unit time of the energy beam in the second partial period of time is smaller than the average of the output energy per unit time of the energy beam in the first partial period of time.

5. A method for producing a spark plug according to claim 1, wherein the output energy per unit time of the energy beam in the second period of time is equal to the output energy per unit time of the energy beam at the end of the first period of time.

6. A method for producing a spark plug according to claim 1, wherein the second period of time includes a first sub-period of time and a second sub-period of time subsequent to the first sub-period of time, and
   wherein the pulse width of the energy beam in the second sub-period of time is narrower than the pulse width of the energy beam in the first sub-period of time.

7. A spark plug comprising:
   an electrode having a base portion and a tip fixed to the base portion, and
   a joint portion which joins the tip and the base portion together,
   wherein a continuous mark and a plurality of spot-shaped marks are formed in a row on a surface of the joint portion.

* * * * *